United States Patent
Zones

[19]

[11] Patent Number: 5,791,841
[45] Date of Patent: Aug. 11, 1998

[54] QUILL INTERLOCK

[76] Inventor: Harry Zones, 2431 Anna Dr. #8, Santa Clara, Calif. 95050

[21] Appl. No.: 732,512

[22] Filed: Oct. 15, 1996

[51] Int. Cl.⁶ .................................................. B23C 9/00
[52] U.S. Cl. ........................... 409/132; 82/152; 408/4; 408/11; 409/134; 409/218
[58] Field of Search .................... 409/134, 132, 409/218; 364/474.19 (U.S. only); 408/10, 11, 4; 82/152; 451/451, 457

[56] References Cited

U.S. PATENT DOCUMENTS

| | | | |
|---|---|---|---|
| 3,548,711 | 12/1970 | Baldwin | 408/4 |
| 3,724,964 | 4/1973 | Needham, Jr. | 408/14 |
| 3,758,835 | 9/1973 | Rose | 318/162 |
| 4,044,650 | 8/1977 | Lyon et al. | 409/183 |
| 4,208,157 | 6/1980 | Guarino et al. | 409/218 |
| 4,507,030 | 3/1985 | Jackson | 409/185 |
| 4,579,487 | 4/1986 | Lehmkuhl | 409/134 |
| 4,697,964 | 10/1987 | Daiko et al. | 408/11 |
| 4,761,101 | 8/1988 | Zettl | 408/11 |
| 4,778,313 | 10/1988 | Lehmkuhl | 408/10 |
| 5,031,106 | 7/1991 | Tanahashi et al. | 364/474.19 |
| 5,256,010 | 10/1993 | Hehl et al. | 408/11 |

FOREIGN PATENT DOCUMENTS

| | | | |
|---|---|---|---|
| 142946 | 7/1980 | Germany | 408/4 |
| 5-185304 | 7/1993 | Japan | 82/152 |

*Primary Examiner*—A. L. Pitts
*Assistant Examiner*—Christopher Kirkman
*Attorney, Agent, or Firm*—James E. Eakin

[57] ABSTRACT

The present invention is a quill interlock for a milling machine. Structurally, the present invention includes a clasp or other attachment means attachable to a milling machine. The clasp carries a switch which is activated when the quill of the milling machine reaches a predetermined, user selected, position on the Z-axis. The switch is connected to the computer controlling the milling machine, causing the computer to relocate the milling machine table to a new X and Y location each time the quill is raised to the predetermined position on the Z-axis.

3 Claims, 2 Drawing Sheets

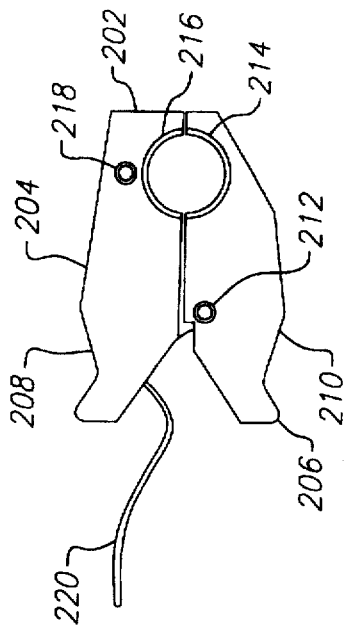
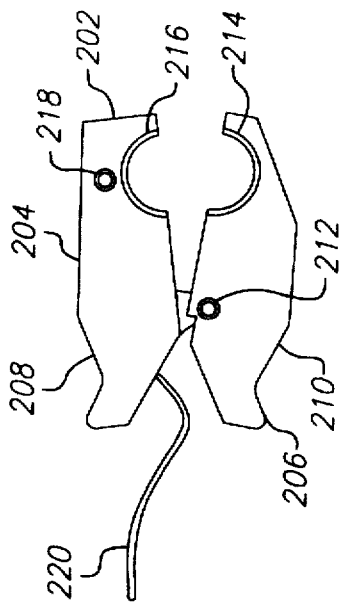
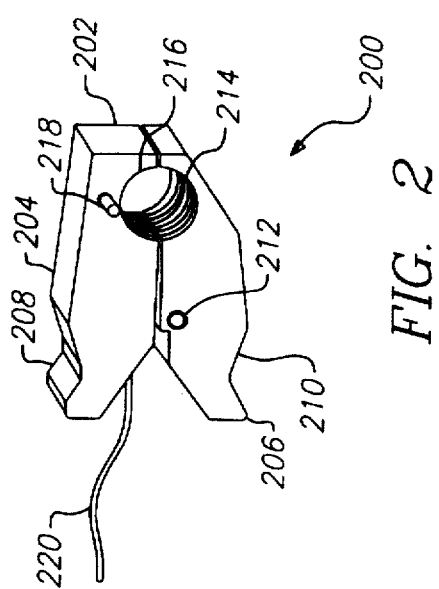
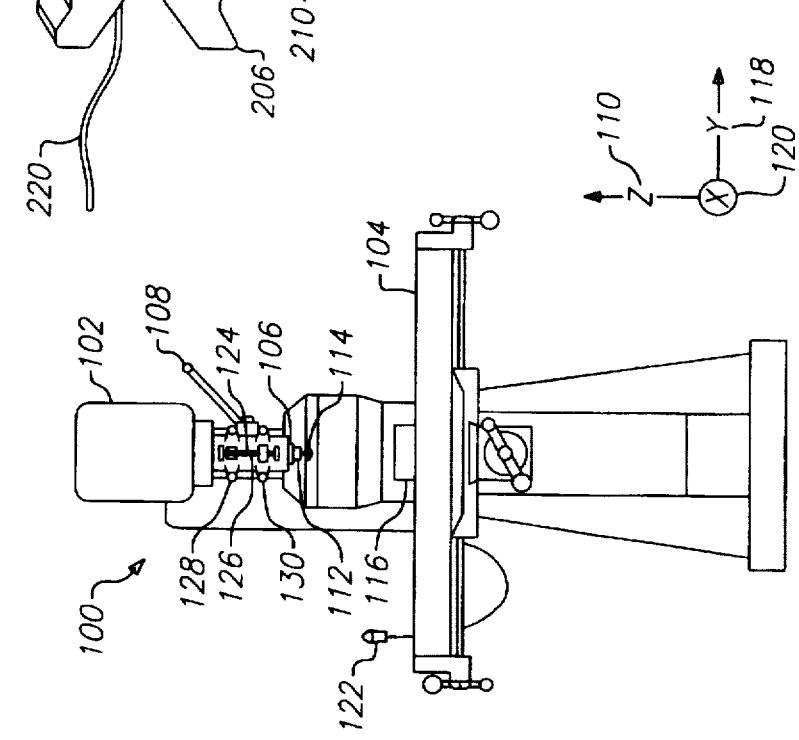

QUILL INTERLOCK

FIELD OF THE INVENTION

The present invention relates generally to tools used for the milling of metal and other substances. More specifically, the present invention is a quill interlock for a milling machine which protects the milling machine and the workpieces in the milling machine from damage attributable to operator error.

BACKGROUND OF THE INVENTION

Milling machines are well known industrial tools. In basic terms, a milling machine is a device for shaping metal or other materials which includes a milling head and a table. The milling head has a rotating chuck which can hold a range of cutting tools. The rotating chuck of the milling head may be raised or lowered along a vertical Z-axis in a manner reminiscent of a drill press. The table of the milling machine is positioned under the rotating chuck and may be moved forward and backward along an X-axis, and side-to-side along a Y-axis. In use, a workpiece is positioned on the table and a cutting tool is placed in the chuck. The workpiece is then shaped by lowering the chuck to cause the cutting tool to make desired modifications to the workpiece. The chuck may then be raised, allowing the table to reposition the workpiece along the X and Y axes. Once repositioned, the chuck may be lowered again to perform another modification to the workpiece. The sequence of modifications, which are separated by repositioning the workpiece, may be repeated an arbitrary number of times to produce workpieces of arbitrary complexity.

In many cases, milling machines employ a form of computer control and actuation. The computer control allows the milling machine to be programmed to perform a predetermined series of operations on a workpiece. The predetermined series of operations may then be repeated for subsequent workpieces, allowing a series of workpieces to be produced in a shorter period of time. In general, several types of computer control and actuation are available. For example, many milling machines include mechanisms which control the table in both the X and Y axes, as well controlling the position of the chuck along the Z axis. Milling machines of this type offer a high degree of automation, and are effectively employed where the work pieces to be produced lend themselves to fabrication with limited operator intervention.

A second type of milling machine controls the table in both the X and Y axes, but leaves control of the position of the chuck along the Z axis to the operator. For this type of machine, the operator lowers and raises the chuck. In between lowering and raising operations, the operator presses a button which informs the computer controlling the machine to move to the next X and Y location. Milling machines of this second type offer an effective and economical production method for many types of workpieces, particularly those which require a large degree of operator intervention.

Unfortunately, the use of the second type of milling machine, i.e., milling machines that control only the X and Y locations of the table, has proven to be problematic. More specifically, machines of this type rely on the operator to correctly time the lowering and raising of the chuck with the relocation of the table and workpiece. If the operator should fail at this task, the computer may attempt to relocate the table with the chuck in the lowered position. Critically, in these cases, the cutting tool may be engaged with the workpiece. As a result, when the computer relocates the workpiece, the cutting tool may be damaged or destroyed with the workpiece suffering a similar fate. Unfortunately, practice has proven that mistakes of this type are fairly common, with the result that cutting tools and workpieces are destroyed all too frequently.

SUMMARY OF THE INVENTION

The present invention is a quill interlock for milling machines. More specifically, many milling machines include a structure known as a milling head which includes a component known as a quill. The quill is a vertically movable structure which carries the chuck of the milling machine. The chuck turns in bearings contained in the quill. By raising or lowering the quill, the operator may control the vertical location of the rotating chuck. More importantly, by lowering or raising the quill, the operator may cause a cutting tool held by the chuck to selectively modify a workpiece.

Typically, a milling machine will include a component known as a quill stop to allow the operator to constrain the vertical, or Z-axis, motion of the quill. The quill stop includes a threaded, vertically oriented rod which is fixed to the milling head of the milling machine. A collar is positioned around the threaded rod and attached to the quill. The collar moves with the quill, as the quill moves along the Z-axis. As a result, movement of the quill causes the collar to move translationally over the threaded rod.

The operator may limit the Z-axis motion of the quill by positioning a quill stop nut (or other device) along the threaded rod. For example, if the operator wants to bore a series of holes to a predetermined depth, the operator would position the quill stop nut to limit the motion of the quill. Each time the quill was lowered in the subsequent boring operations, the collar would contact the quill stop nut when the desired depth had been reached, allowing each hole to be bored to the predetermined depth.

The present invention is a clip or other device that is quickly attachable to the threaded rod of a quill stop of a milling machine. A pressure sensitive switch is carried by the clip and is electrically connected to the computer that controls the X and Y location of the milling machine table. In use, the operator of the milling machine first determines the position to which the quill must be raised to ensure a safe clearance between the cutting tool and the workpiece. Importantly, the position chosen must account both for the topography of the workpiece as well as for each X and Y relocation of table which occurs during the machining of the workpiece. This can be accomplished by choosing a position which ensures that the cutting tool clears all features of the workpiece regardless of where the workpiece is positioned on the X and Y axes.

Once a quill position has been correctly chosen, the clip is attached to the threaded rod of the quill stop at a location which is just above and adjacent to the quill stop's collar. When attached in this manner, the switch is contacted by the collar each time the quill is raised to the position of safe clearance. Subsequently, the operator may begin machining the workpiece. When the operator has completed the machining required at a particular X-Y location, the quill is raised to the position of safe clearance. Raising the quill activates the switch of the quill interlock, informing the computer that the table may be relocated to a new X-Y position.

Objects and advantages of the invention will be set forth, in part, in the description which follows and, in part, will be understood by those skilled in the art from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a front view of a milling machine shown as a representative environment for the quill interlock of the present invention.

FIG. 2 is an orthogonal view of the quill interlock of the present invention.

FIG. 3 is a side view of the quill interlock of the present invention.

FIG. 4 is a side view of the quill interlock, as shown in FIG. 3 with the quill interlock now shown in an open configuration.

DETAILED DESCRIPTION OF THE PREFERRED EMBODIMENTS

Figure 5:
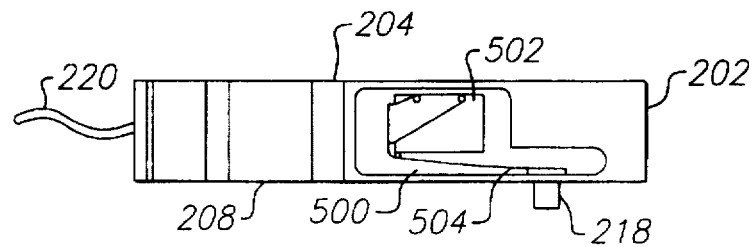
FIG. 5 is a top view of the quill interlock of the present invention, showing the microswitch of the present invention.

Reference will now be made in detail to the preferred embodiments of the invention, examples of which are illustrated in the accompanying drawings. Wherever possible, the same reference numbers will be used throughout the drawings to refer to the same or like parts.

In FIG. 1, a milling machine 100 is shown as a representative environment for the present invention. More specifically, FIG. 1 shows that milling machine 100 includes a milling head 102 positioned over a table 104. Milling head 102 includes a quill 106 and a control handle 108. By moving control handle 108, an operator may cause quill 106 to move translationally in line with a vertical Z-axis 110. In other words, by moving control handle 108, the operator may cause quill 106 to be moved closer to, or further away from, table 104. A rotating chuck 112 is carried by quill 106. Chuck 112 is used to grasp a bit 114 or other cutting tool. Moving quill 106 over Z-axis 110 causes an equivalent motion of chuck 112 and bit 114. In this way, bit 114, rotating in chuck 112, may be moved along Z-axis 110 to selectively contact workpiece 116, boring or otherwise reshaping workpiece 116.

Table 104 is movable in translation along Y-axis 118 and X-axis 120. Importantly, milling machine 100 includes a form of programmable computer control and actuation. This computer control and actuation allows a sequence of X and Y locations to be preprogrammed. By actuating a button or other control 122, the operator can cause table 104 to move to each X and Y location in the sequence. Generally, at each X and Y location, the operator will move control handle 108 to cause bit 114 to selectively reshape workpiece 116. In between reshaping operations, the operator will move control handle 108 to move bit 114 away from workpiece 116. The operator then actuates control button 122 to move table 104 to the next location in the preprogrammed sequence.

Milling machine 100 also includes a quill stop 124. Quill stop 124 includes a threaded rod 126 attached to milling head 102 and aligned with Z-axis 110. A collar 128 is attached to quill 106 and positioned over threaded rod 126. Movement of quill 106 along the Z-axis 110 causes collar 128 to move in translation over threaded rod 126. A quill stop nut 130 is threadably attached to threaded rod 126. Quill stop nut 130 may be rotated, allowing the position of quill stop nut 130, on threaded rod 126, to be selectively controlled. Functionally, quill stop nut 130 functions as a stop for collar 128. Adjusting the position of quill stop nut 130 adjusts the stop position of collar 128 and quill 106 along the Z-axis 110. In this way the operator may use quill stop 124 to selectively control the depth of a particular boring or cutting operation.

In FIG. 2, the quill interlock of the present invention is shown and generally designated 200. Structurally, quill interlock 200 includes a clasp 202 formed from an upper half 204 and a lower half 206. Upper half 204 and lower half 206 are preferentially formed with relief 208 and relief 210, respectively. Upper half 204 and lower half 206 are hinged together at pivot 212. The hinged connection between upper half 204 and lower half 206, allows clasp 200 to move between the closed configuration shown in FIGS. 2 and 3, and an open configuration shown in FIG. 4. Clasp 202 also includes a spring (not shown) which biases clasp 202 to preferentially adopt the closed configuration of FIGS. 2 and 3. Upper half 204 is formed with a half bore 214. Likewise, lower half 206 is also formed with a matching half bore 216. Half bore 214 and half bore 216 are threaded with a thread pattern that matches the thread pattern of threaded rod 126 of quill stop 124. As a result, quill interlock 200 may be attached on threaded rod 126 with threaded rod 126 passing through half bore 214 and half bore 216. Alternatively, clasp 202 may be fabricated using any method which allows attachment to threaded rod 126 at a selectable location.

Figure 6:
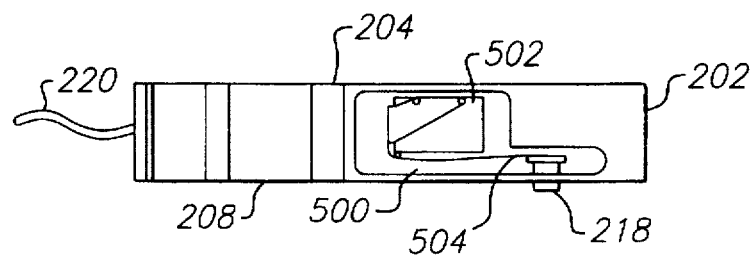
FIG. 6 is a top view of the quill interlock of the present invention, as shown in FIG. 5, with the microswitch now shown in an activated position.

Continuing with FIG. 2, it may be seen that quill interlock 200 includes a pin 218. Additionally, as seen in FIGS. 5 and 6, upper half 204 of clasp 202 is formed with a cavity 500. A microswitch 502 is positioned inside of cavity 500 and includes an actuator 504. Movement of pin 218 results in movement of actuator 504, triggering microswitch 502. Movement of this type is shown more clearly in FIG. 6 where the pin 218 has moved translationally, causing movement of the actuator 504 and activation of the microswitch 502.

An electric lead 220 is connected to microswitch 502. Additionally, electric lead 220 is connected to milling machine 100 in place of switch 122. Thus, microswitch 502 functionally replaces switch 122. Although microswitch 502 is shown as a pressure sensitive switch, a number of equivalent technologies may be used. For example, microswitch 502 may be implemented as an infrared or optical switch or any number of other technologies. In fact, any technology which allows proximity detection may be adapted to function in place of microswitch 502. Preferably, a cover (not shown) is positioned over cavity to enclose microswitch 502.

Figures 7, 8:
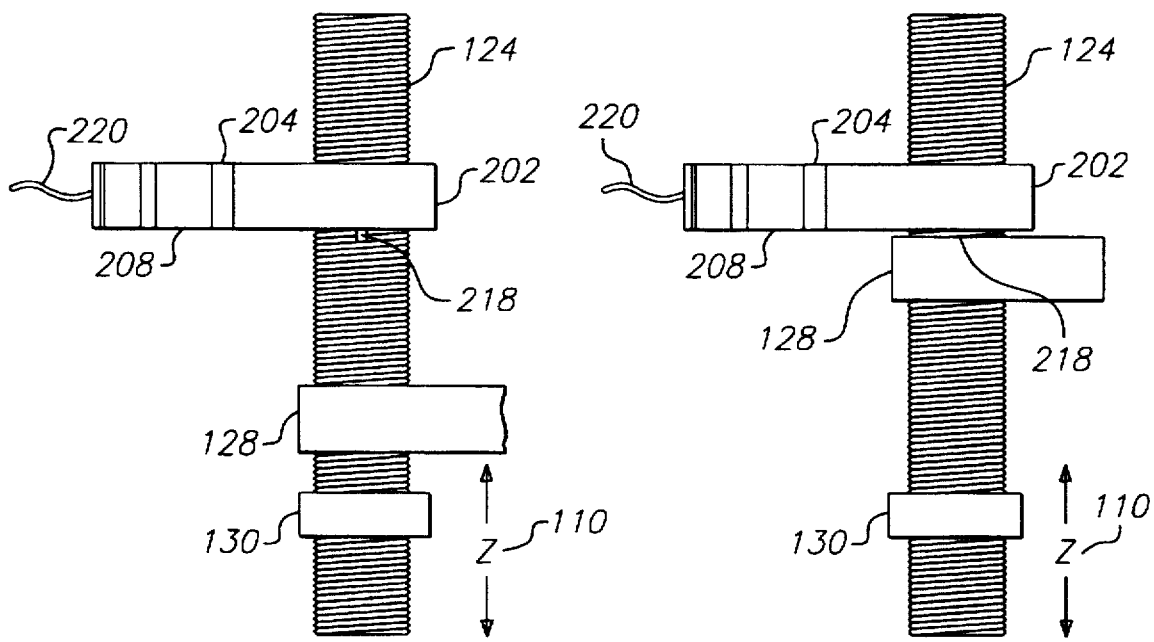
FIG. 7 is a top view of the quill interlock of the present invention, shown operationally engaged with the quill of a milling machine.
FIG. 8 is a top view of the quill interlock of the present invention, as shown in FIG. 7, with the collar of the quill stop now shown positioned to activate the switch of the quill interlock.

Use of quill interlock 200 is better appreciated by reference to FIGS. 7 and 8. In more detail, FIGS. 7 and 8 show the quill 124 of the milling machine 100. Additionally, FIGS. 7 and 8 show quill interlock 200 attached to threaded rod 126 of quill interlock 200. When attached in this fashion, pin 218 faces collar 128. As already discussed, collar 128 moves translationally over threaded rod 126 as quill 106 moves translationally over Z-axis 110. Thus, quill stop nut 130 is positioned to limit the movement of quill 106 towards table 104. Additionally, quill interlock 200 is positioned so that pin 218 contacts collar 128 when quill 106 reaches a certain elevation above table 104. This contact is shown specifically in FIG. 8, where collar 128 has contacted pin 218. Contact between pin 218 and collar 128 activates microswitch 502.

Importantly, quill interlock 200 may be positioned at any location along threaded rod 126 of quill interlock 200. Thus, the elevation of quill 106 on Z-axis 110 which causes contact between pin 218 and collar 128 may be selected by the operator. Keeping this in mind, the use of the present invention begins by selecting an elevation on Z-axis 110 which will ensure that quill 106, chuck 112 and bit 114 each clear workpiece 116. Preferably, the established clearance ensures that workpiece 116 may be moved translationally over X-axis 120 and Y-axis 118 without contacting quill 106, chuck 112 or bit 114. Thus, if workpiece 216 has an irregular shape, the clearance must be adjusted accordingly. Once the clearance has been established, quill interlock 200 is positioned so that collar 128 contacts and activates pin 218 when quill 106 reaches the required elevation. Additionally, quill stop nut 130 may be selectively located along threaded rod 126 to limit motion of quill 106 towards table 104.

Assuming that quill interlock 200 has been properly positioned and that milling machine 100 has been preprogrammed to traverse a sequence of X and Y locations, machining workpiece 116 may then begin. At each preprogrammed X and Y location, the operator will manipulate control handle 108 to cause bit 114 to selectively reshape workpiece 116. When reshaping at a particular X and Y location is complete, operator will manipulate handle 108 to raise bit 114 and quill 106. When raised to the correct elevation, collar 128 contacts pin 218 and microswitch 502. This informs the milling machine 100 that quill 106, chuck 112 or bit 114 are clear of workpiece 116. Thus informed, milling machine 100 proceeds to relocate table 104 and workpiece 116 to the next X and Y location in the preprogrammed sequence.

For the purposes of the present invention, a number of alternate embodiments are possible. For example, it is entirely practical for clasp 202 to be attachable directly to milling head 102. Alternatively, clasp 202 may be fabricated to be attachable to collar 128. In fact, for the purposes of the present invention, clasp 202 may be attached to any first part of milling machine 100 which causes a second part of milling machine 100 to activate microswitch 502 at an operator selectable position of quill 106. Thus, clasp 202 may be fabricated from a range of differing attachment technologies including vacuum and magnetic attachments.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A quill interlock system for a milling machine, the milling machine including a quill movable along a Z-axis and a table movable along X and Y axes with the movement of the table being under the control of a computer, the system comprising:

a switch electrically connected to the computer controlling the X and Y location of the milling machine table; and a hand-actuable clasp for attaching the switch to a first part of the milling machine, the location of the switch and clasp being selectable to place the switch in contact with a second part of the milling machine when the quill reaches a user selectable position along the Z-axis, contact between the second part of the milling machine and the switch activating the switch and causing the computer to relocate the table to a new X and Y location.

2. A quill interlock system for a milling machine, the milling machine including a quill movable along a Z-axis and a table movable along X and Y axes with the movement of the table being under the control of a computer, the system comprising:

detection means connected to the computer controlling the X and Y location of the milling machine table; and hand-actuable attachment means for attaching the detection means to a first part of the milling machine, the location of the attachment means being selectable to cause activation of the detection means when the quill reaches a user selectable position along the Z-axis, activation of the detection means causing the computer to relocate the table to a new X and Y location.

3. A method for using a milling machine, the milling machine including a quill movable along a Z-axis and a table movable along X and Y axes with the movement of the table being under the control of a computer, the method comprising the steps of:

providing a quill interlock, the quill interlock including detection means connected to the computer controlling the X and Y location of the milling machine table, and hand-actuable attachment means for attaching the detection means to a first part of the milling machine;

preprogramming the computer to cause the table to traverse a sequence of X and Y locations under control of the quill interlock; and attaching the quill interlock to a first part of the milling machine, the location of the attachment means being selected to cause activation of the detection means when the quill reaches a user selectable position along the Z-axis, activation of the detection means causing the computer to relocate the table to the next X and Y location in the sequence of X and Y locations.

* * * * *